Figure 1:
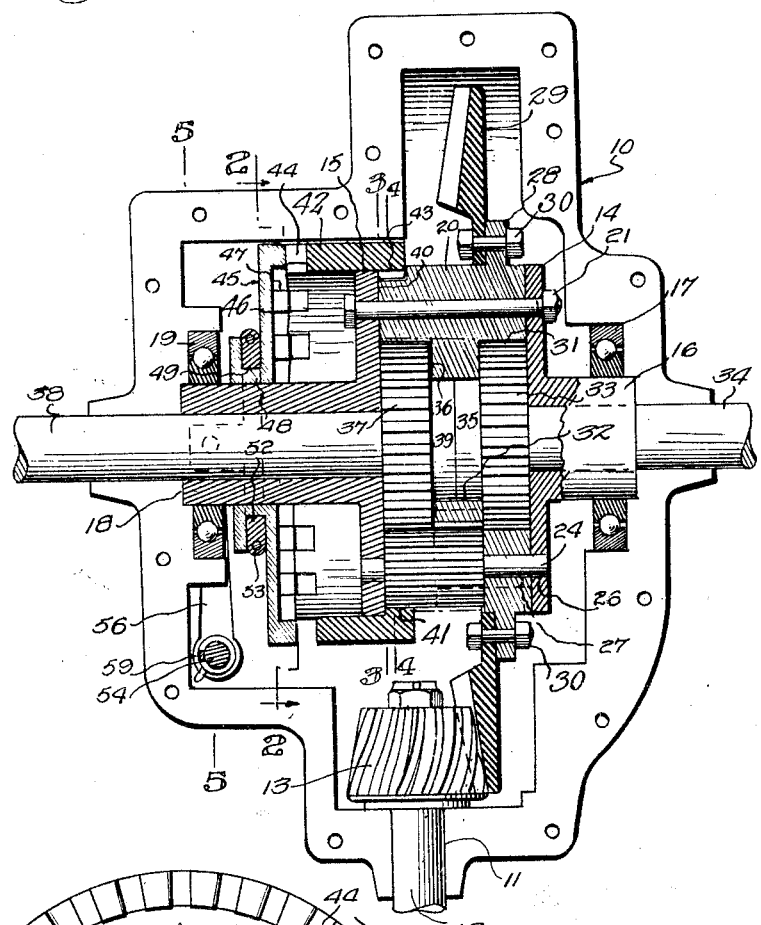

Nov. 13, 1928.　　　　　　　　　　　　　　　1,691,230
R. L. DENNISON
DIFFERENTIAL GEARING
Filed July 6, 1926　　　2 Sheets-Sheet 1

Inventor
ROBERT L. DENNISON

By

Attorney

Nov. 13, 1928.  1,691,230
R. L. DENNISON
DIFFERENTIAL GEARING
Filed July 6, 1926   2 Sheets-Sheet 2

Inventor
ROBERT L. DENNISON
By
Attorney

Patented Nov. 13, 1928.

1,691,230

UNITED STATES PATENT OFFICE.

ROBERT L. DENNISON, OF NEW YORK, N. Y.

DIFFERENTIAL GEARING.

Application filed July 6, 1926. Serial No. 120,818.

This invention relates to differentials and more particularly to a locking differential for automobiles whereby the rear axle sections may be caused to rotate at the same speed.

An important object of the invention is the provision of a differential having novel means for locking the rear axle sections driven by the differential whereby they may be caused to rotate together substantially as a unit at the same speed, when desired.

A further object is to provide a transmission of the above mentioned character wherein the locking action is effected without placing severe strains on the working parts of the device.

A further object is to provide a differential having novel locking means of the character referred to, the locking means including a pair of relatively movable members adapted to be brought into engagement with each other to effect the locking action, the relatively movable members normally rotating in the same direction at substantially the same speed whereby the locking action may be easily and smoothly effected without subjecting any of the parts of the device to sudden strains.

Other objects and advantages of the invention will become apparent during the course of the following description.

Figure 2:
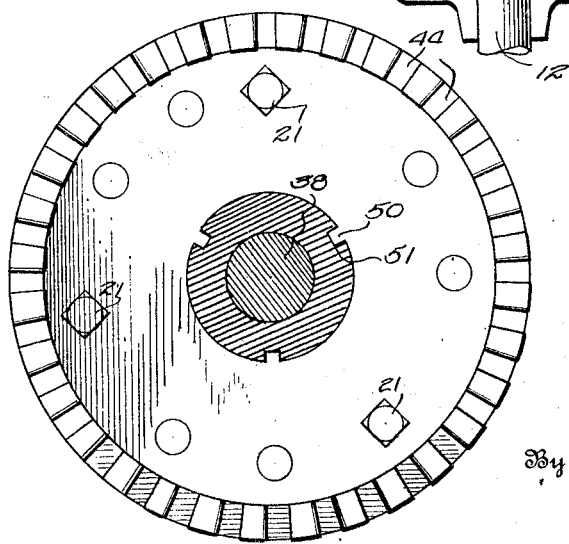
Figure 3:
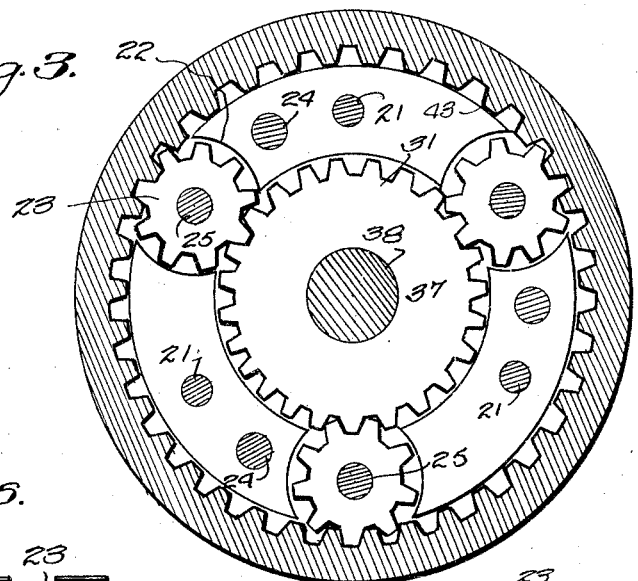
Figure 6:
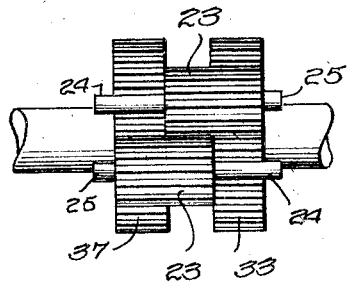
Figure 4:
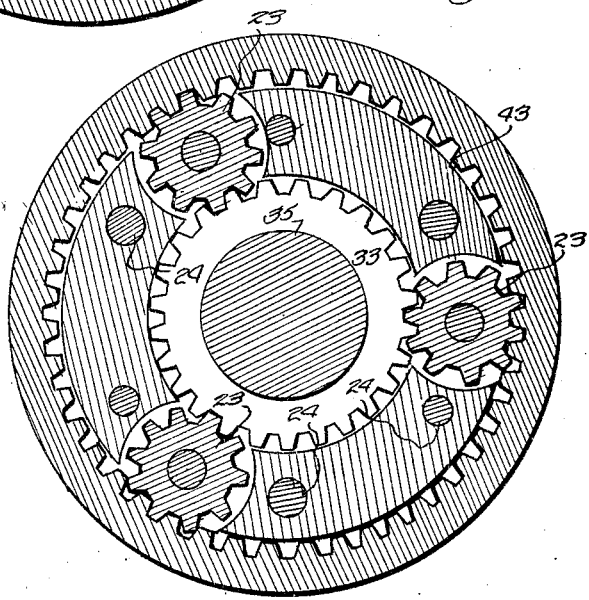
Figure 5:
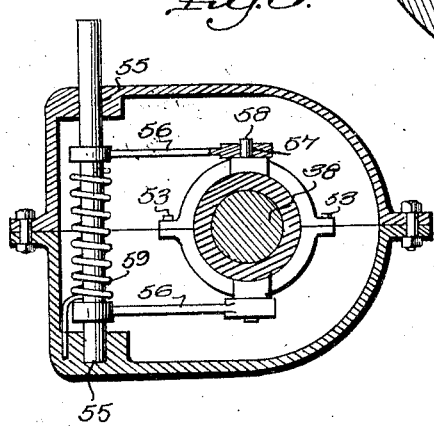

In the drawings I have shown one embodiment of the invention. In this showing,

Figure 1 is a horizontal sectional view through the differential,

Figure 2 is a detail section taken on line 2—2 of Figure 1, the gear casing being omitted, Figure 3 is a section on line 3—3 of Figure 1, Figure 4 is a similar view on line 4—4 of Figure 1, Figure 5 is a similar view on line 5—5 of Figure 1, and, Figure 6 is a detail view of a portion of the gearing.

Referring to the drawings, the numeral 10 designates a differential housing formed of a pair of sections in the usual manner and provided with a bearing 11 in which is journalled a transmission shaft 12 provided within the housing with a bevelled pinion 13. The shaft 12 is connected with the usual automobile transmission, as will be understood.

A pair of plates 14 and 15 are arranged within the housing, the plate 14 being provided with a relatively short tubular extension 16 journalled in bearings 17 carried by the differential housing. The other plate 15 is provided with a relatively long tubular extension 18 journalled in bearings 19 also carried by the housing. As clearly shown in Figure 1, a gear frame 20 is arranged between the plates 14 and 15, the latter being secured to the gear frame by bolts 21 spaced as shown in Figure 3. The frame is provided in each side with a plurality of substantially circular recesses 22, the recesses at one side of the frame being offset circumferentially from the recesses of the other side for a purpose to be described.

A plurality of pinions 23 are arranged in the recesses 22 in each side of the gear frame, as shown in Figures 1, 3 and 4. These pinions are relatively long, as shown in Figure 6, and each is provided at one end with a relatively long stub shaft 24 and at its opposite end with a relatively short stub shaft 25. The pinions at each side of the gear frame are offset with respect to each other, but overlap and mesh with each other at their inner ends as clearly shown in Figure 6. The outer ends of each of the stub shafts 24 and 25 are journalled in openings 26 formed in the plates 14 and 15. The inner portions of the relatively long stub shafts 24 are journalled in bearing openings 27 formed in the gear frame. The frame 20 is provided with a peripheral flange 28 to which a bevelled ring gear 29 is bolted as at 30. As shown in Figure 1, the pinion 13 and gear 29 mesh with each other whereby rotation of the frame is adapted to effect rotation of the gear 29 and consequently, of the gear frame 20.

The frame 20 is further provided with central recesses 31 formed in opposite sides thereof, the recesses communicating with each other through a bearing opening 32. A gear 33 is arranged in one of the recesses 31 and is free to rotate therein. The teeth of the gear 33 mesh with one set of pinions 23, as shown in Figure 3. The gear 33 is provided with an axle section 34 which is connected to one of the rear wheels of the automobile in connection with which the device is employed. It will be apparent that the tubular extension 16 acts as a bearing for the inner end of the axle section 34. The gear 33 is further provided at its inner end with an extension 35 which is rotatable within the bearing opening 32.

The opposite side of the gear frame 20 also is provided with a recess 36 in which is arranged a gear 37. The gear 37 is identical in size with the gear 33 and is secured to the other axle section 38 as will be apparent. The gear 37 is also provided with an extension 39, which is rotatable in the bearing opening 32 and abuts the extension 35 of the gear 33.

The frame 20 is provided near one side with a peripheral recess 40 in which is rotatably arranged a flange 41 carried by an annular substantially cylindrical ring 42. The flange 41 is provided with an internal ring gear 43 while the outer end of the ring 42 is provided with clutch teeth 44. It will be apparent that the ring 42 is rotatably supported by the plate 15, and the ring gear 43 meshes with the adjacent set of pinions 23, as shown in Figure 5. The ring 42 and its clutch teeth 44 constitute one member of a pair of locking members, the other locking member being indicated as a whole by the numeral 45. The member 45 includes a radial plate portion 46 having teeth 47 extending inwardly therefrom. The teeth 47 are adapted to mesh with the teeth 44 to cause the two locking members to rotate as a unit, in a manner to be described. The locking member 45 is provided with a hub portion 48 having a peripheral groove 49 therein. The hub portion 48 is further provided with a plurality of inwardly extending keys 50 slidably arranged in key ways 51 formed in the tubular extension 18. The keys 50 and key ways 51 form a spline connection between the tubular extension 18 and the locking member 45 whereby the latter is adapted to slide longitudinally. A split collar 52 is arranged in the groove 49, the two sections of the collar being secured together by bolts 53.

A shaft 54 is rotatable in bearings 55 formed in the differential housing, as shown in Figure 5. This shaft is provided within the housing with a pair of arms 56 rigidly connected thereto at end, the opposite ends of the arms being provided with openings 57 adapted to receive pins 58 carried by the collar 52. A spring 59 surrounds the shaft 54 between the arms 56, one end of the spring being secured to the shaft and the other end to the differential housing whereby the arms 56 are normally maintained in the position shown in Figure 1.

The operation of the device is as follows:

The pinions 23 are inserted into their respective recesses 22 in the gear frame 20, whereupon the plates 14 and 15 are bolted in position. It will be apparent that the frame 20 and plates 14 and 15 form in effect a single rotating unit, the plates also serving the purpose of retaining the pinions in proper position without other securing means. It also will be apparent that the flange 41 of the locking member 42 is arranged in position prior to securing the plate 15 to the gear frame, and therefore the plate 15 also serves to retain the locking member in proper position. When the device is in operation, power is transmitted to the ring gear 29 by the pinion 13 in the usual manner, and this action rotates the gear frame 20. If the vehicle is traveling in a straight line, rotation of the frame 20, causes the axes of the pinions 23 to travel in a circle about the axis of the frame 20. The two sets of pinions 23 mesh with each other and with the gears 33 and 37 to drive the axle sections, as previously stated, and since there is no differential movement between the axle sections 34 and 38, the pinions 23 will not rotate about their own axes, and accordingly the locking member 42 will rotate at the same speed as the gear frame 20 since the ring gear 43 meshes with one set of the pinions 23. Since the other locking member 45 is fixed to rotate with the sleeve 18, it will be obvious that this locking member also rotates at the same speed as the frame 20. It will be apparent that the device is adapted to operate in the same manner as an ordinary differential when the vehicle is turning a corner, in which case the pinions 23 will rotate about their own axes to accommodate the difference in the rotative speed of the axle sections 34 and 38. Under any condition however, it will be apparent that the two locking members are constantly rotating in the same direction. When it is desired to lock the two axle sections to cause them to rotate at the same speed, a suitable handle or pedal (not shown) connected to the shaft 54 is operated to rotate the shaft. This action swings the arms 56 inwardly to move the collar 52, whereby the teeth 47 will be caused to mesh with the teeth 44. This action prevents rotation of the locking member 42 with respect to the locking member 45, and also with respect to the frame 20 since the latter two elements are secured together. The locking action referred to obviously will prevent rotation of the pinions 23 about their own axes, and accordingly there can be no differential action between the axle sections 34 and 38. The locking action may be released merely by permitting the spring 59 to return the shaft 54 and associated elements to normal position. Since the two locking devices are always rotating in the same direction, it will be apparent that the locking action is adapted to take place smoothly without clashing of the teeth 44 and 47, and accordingly none of the elements of the device are subjected to severe sudden strains. It will be apparent that the locking member 42 is a floating rotating member, being freely rotatable with respect to the frame 20 and plate 15 and being governed in its rotating movement only by the action of the pinions 23.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Differential gearing comprising a main driven gear, pinions carried thereby, a pair of gears driven by said pinions, a shaft connected to each gear of said pair, a locking member rotated by said driven gear, and a coacting locking member driven by said pinions, said locking members being coaxial and adapted to be brought into peripheral engagement with each other by movement of said first named locking member.

2. Differential gearing comprising a main driven gear, pinions carried thereby, a pair of gears driven by said pinions, a shaft connected to each gear of said pair, a locking member rotated by said driven gear, and a coaxial coacting locking member driven by said pinions, the first named locking member being movable to bring it into peripheral engagement with the other locking member, and means for moving said movable locking member.

3. Differential gearing comprising a main driven gear, pinions carried thereby, a pair of gears driven by said pinions, a shaft connected to each gear of said pair, a locking member rotated by said driven gear, and a coacting locking member having gear teeth meshing with certain of said pinions to be driven thereby in the same direction as said first named locking member, at least one of said locking members being movable to permit them to be brought into engagement with each other.

4. A device constructed in accordance with claim 3 wherein said locking members are coaxial, one of said locking members being movable along its axis to permit it to be brought into engagement with the other locking member, and means for moving said movable locking member.

5. Differential gearing comprising a main driven gear, pinions carried thereby, a pair of coaxial gears driven by said pinions, a shaft connected to each gear of said pair, a locking member rotated by said driven gear, a coacting locking member having gear teeth meshing with certain of said pinions to be driven thereby in the same direction as said first named locking member, said locking members surrounding the axis of said shafts and arranged coaxially with respect to each other, one of said locking members being axially movable to permit it to be brought into engagement with the other locking member, and means for moving said movable locking member.

6. Differential gearing comprising a main driven gear, a gear frame carried by said gear, a pair of sets of pinions carried by said frame, one pinion of each set meshing with one pinion of the other set, a gear meshing with each set of pinions, a shaft secured to each of said gears, a locking member rotatable with said frame, a second locking member having a portion surrounding a portion of said frame and provided with a ring gear meshing with one set of pinions, at least one of said locking members being movable to bring them into engagement with each other, and means for effecting relative movement of said locking members.

7. Differential gearing comprising a main driven gear, a gear frame carried by said driven gear and provided in opposite sides with circularly arranged recesses, a pinion rotatably mounted in each of said recesses, said frame being provided with a peripheral groove communicating with the recesses in one side thereof, gears meshing with said pinions, shafts carried by said gears, a locking member having a portion projecting into said peripheral groove and provided with gear teeth meshing with the pinions arranged in the adjacent side of said frame, a second locking member rotatable with said frame and movable axially into engagement with said first named locking member, and means for moving said last named locking member.

8. Differential gearing comprising a main driven gear, a gear frame carried by said gear and provided in each side with a set of circularly arranged recesses, a set of pinions arranged in each set of said recesses, said frame being provided with a peripheral groove communicating with one set of said recesses, a gear meshing with each set of pinions, a shaft carried by each of said gears, a plate secured against each end of said gear frame, one of said plates being provided with an axial tubular extension surrounding one of said shafts, a locking member splined on said tubular extension and provided on its inner face with clutch teeth, a second locking member arranged between said first named locking member and said gear frame and provided with an annular portion arranged in said peripheral groove and having gear teeth meshing with the adjacent set of pinions, said second named locking member being provided on its outer face with clutch teeth, and means for sliding said first named locking member to bring the clutch teeth thereof into engagement with the clutch teeth of said second named locking member.

In testimony whereof I affix my signature.

ROBERT L. DENNISON.